United States Patent
Nishikawa et al.

(10) Patent No.: US 8,532,811 B2
(45) Date of Patent: Sep. 10, 2013

(54) APPARATUS FOR AND METHOD OF MEASURING WORKPIECE ON MACHINE TOOL

(75) Inventors: Shizuo Nishikawa, Nara (JP); Kenichiro Ueno, Nara (JP); Hisayoshi Morita, Nara (JP); Katsuhiko Ono, Nara (JP)

(73) Assignee: Mori Seiki Co., Ltd., Yamatokoriyama-Shi (JP)

( * ) Notice: Subject to any disclaimer, the term of this patent is extended or adjusted under 35 U.S.C. 154(b) by 200 days.

(21) Appl. No.: 13/079,232

(22) Filed: Apr. 4, 2011

(65) Prior Publication Data
US 2011/0251714 A1 Oct. 13, 2011

(30) Foreign Application Priority Data

Apr. 12, 2010 (JP) ................................ 2010-091095

(51) Int. Cl.
*G06F 19/00* (2011.01)

(52) U.S. Cl.
USPC .......................................... 700/174; 700/175

(58) Field of Classification Search
USPC ................. 700/159, 160, 170, 173, 174, 186, 700/187, 195, 175
See application file for complete search history.

(56) References Cited

U.S. PATENT DOCUMENTS 6,973,738 B2 * 12/2005 Kaneda et al. .................. 33/636
2002/0189120 A1 * 12/2002 Kaneda et al. .................. 33/636

FOREIGN PATENT DOCUMENTS

| DE | 10 2005 040 180 A1 | 12/2006 |
| EP | 2 062 686 A1 | 5/2009 |
| FR | 2 287 679 A1 | 5/1976 |
| JP | 2007-518579 A1 | 7/2007 |
| WO | WO 2005/065884 A2 | 7/2005 |

OTHER PUBLICATIONS

European Search Report dated Sep. 16, 2011.

* cited by examiner

*Primary Examiner* — Charles Kasenge
(74) *Attorney, Agent, or Firm* — Kratz, Quintos & Hanson, LLP

(57) ABSTRACT

A workpiece measuring apparatus has an external module provided outside an NC device to acquire position data of one or more movable axes of a movable unit having a measuring head attached thereto. The position data of the measuring head is acquired at the same time interval as that for the distance measurement by the measuring head. The position of the workpiece is acquired by calculation from the acquired distance measurement data and the position data of the measuring head. The continuous shape of the workpiece can be measured by performing continuous measurement while moving the measuring head. Therefore, no modification or change is required such as adding a new function to the NC device. In addition, the present invention is applicable to any machine tool equipped with an NC device of any configuration, without being restricted by constraints of the NC device.

4 Claims, 7 Drawing Sheets

FIG.4

| MEASURED DISTANCE D | POSITION DATA C1 ALONG THREE PERPENDICULAR AXES | | | COORDINATES OF MEASUREMENT POINT S | | |
|---|---|---|---|---|---|---|
| | POSITION ALONG X-AXIS | POSITION ALONG Y-AXIS | POSITION ALONG Z-AXIS | ALONG X-AXIS | ALONG Y-AXIS | ALONG Z-AXIS |
| 50.010 | 0 | 0 | 60.000 | 0 | 0 | 9.990 |
| 49.998 | 1.736 | 0 | 59.848 | 1.736 | 0 | 9.850 |
| 50.003 | 3.420 | 0 | 59.397 | 3.420 | 0 | 9.394 |
| 50.012 | 5.000 | 0 | 58.660 | 5.000 | 0 | 8.648 |
| -------- | -------- | -------- | -------- | -------- | -------- | -------- |

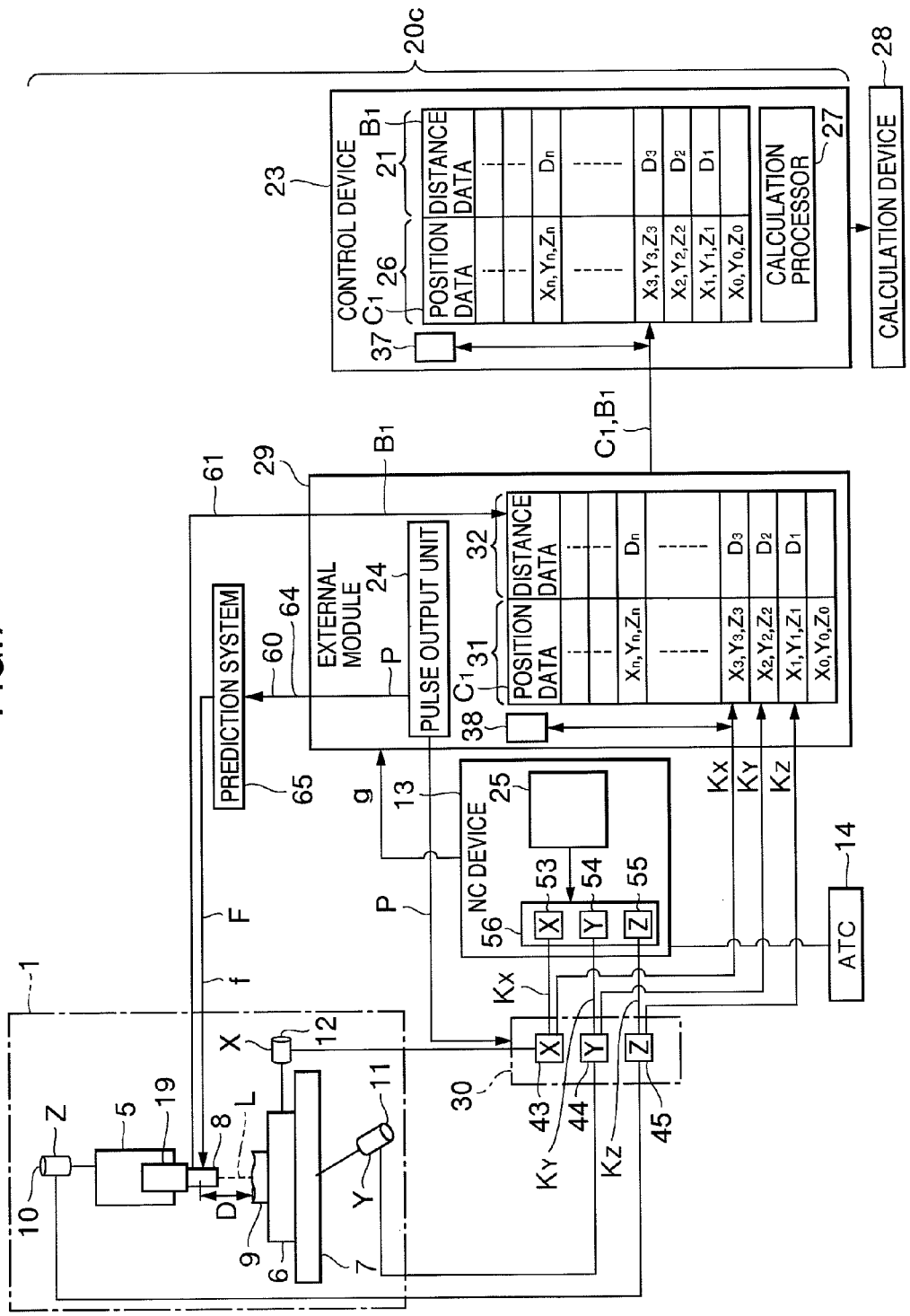

APPARATUS FOR AND METHOD OF MEASURING WORKPIECE ON MACHINE TOOL

BACKGROUND OF THE INVENTION

1. Field of the Invention

The present invention relates to an apparatus for and a method of measuring a workpiece on a machine tool, wherein the workpiece is measured with a wired or wireless measuring head attached to a movable unit moving relatively to the workpiece in a machining area of the machine tool.

2. Description of the Related Art

For a machine tool such as a machining center, there have been proposed techniques of measuring the shape of the surface of a workpiece attached to the machine tool without removing the workpiece from the machine tool after machining. For example, a workpiece inspection system for a machine tool is described in Japanese published patent application JP2007-518579 (corresponding to WO 2005/065884). This work inspection system has a probe (corresponding to the measuring head of the present invention) mounted on a main spindle of the machine tool. The data measured, when a needle of the probe contacts the workpiece, is output and an NC (numerical control) device also acquires position data of the probe. The measurement data and the position data are combined to inspect the workpiece.

The inspection system described in JP2007-518579 is configured in such a manner that a programmable controller receives the position data of the probe from the NC device for calculating. Accordingly, modification or change of the NC device or the programmable controller such as adding a new function thereto has been required in order to inspect the workpiece.

In addition, the inspection system, which is subject to restrictions of the NC device and the programmable controller, is not necessarily applicable to all machine tools.

The operation of acquiring the position data of the probe from the NC device is performed intermittently during the operation control on the machine tool, which is the primary role of the NC device. As a result, it has been difficult to acquire the position data of the probe at a precise timing. In addition, it has been also impossible to shorten the time interval for acquiring the position data to acquire a large amount of measurement data from the probe at high speed. Therefore, it has been difficult to measure a wide range of workpieces in a short time.

SUMMARY OF THE INVENTION

It is an object of the present invention, which has been conceived to solve the above problems, to provide an apparatus for and a method of measuring a workpiece on a machine tool. The present invention is applicable to any machine tool equipped with an NC device and a programmable controller of any configuration, without the necessity of modification or change such as adding a new function to the NC device and the programmable controller, and without being restricted by constraints of the NC device and the programmable controller.

Further, it is another object of the present invention to perform high speed scanning by a measuring head without any time constraint, when acquiring position data of the measuring head from the NC device, and to measure a two- or three-dimensional shape of the workpiece in a short time, so that it becomes possible to quickly proceed to a machining operation after the measurement.

In order to achieve the above objects, there is provided in accordance with the present invention a workpiece measuring apparatus for detecting a position and a shape of a workpiece by a measuring head attached to a movable unit of a machine tool moving relative to the workpiece, within a machining area of the machine tool controlled by an NC device, wherein the measuring head is a displacement sensor capable of measuring a distance to the workpiece and outputting distance data, an external module is provided outside the NC device to acquire position data of one or more movable axes of the movable unit having the measuring head attached thereto, the external module is configured in such a manner that the position data of the measuring head attached to the movable unit is acquired at a same time interval as that of distance measurement by the measuring head, a position of the workpiece is acquired by calculation from the acquired distance measurement data and the position data of the measuring head, and a continuous shape of the workpiece is measured by performing continuous measurement while moving the measuring head.

Preferably, the workpiece measuring apparatus comprises a memory which combines and stores, at same time points, the position data of the movable axis which is output from a position detecting device along the each axis direction of the movable unit and the distance data which is measured by the measuring head.

Preferably, the position data of the movable axis having the measuring head attached thereto is data branched from a motor encoder signal used by the NC device, or data which is output from a separately added dedicated position detecting device.

In order to achieve the above objects, there is provided in accordance with the present invention a method of measuring a workpiece on a machine tool, the method being detecting a position and a shape of the workpiece by a measuring head attached to a movable unit of the machine tool moving relative to the workpiece, within a machining area of the machine tool controlled by an NC device, wherein with a workpiece measuring apparatus used in the method, the measuring head is a displacement sensor capable of measuring a distance to the workpiece and outputting distance data, an external module is provided outside the NC device to acquire position data of one or more movable axes of the movable unit having the measuring head attached thereto, the external module is configured in such a manner that the position data of the measuring head attached to the movable unit is acquired at a same time interval as that of distance measurement by the measuring head, a position of the workpiece is acquired by calculation from the acquired distance measurement data and the position data of the measuring head, and a continuous shape of the workpiece is measured by performing continuous measurement while moving the measuring head.

Since the apparatus for and the method of measuring a workpiece on a machine tool according to the present invention are configured as mentioned above, the present invention is applicable to any machine tool equipped with an NC device and a programmable controller of any configuration, without the necessity of modification or change such as adding a new function to the NC device and the programmable controller, and without being restricted by constraints of the NC device and the programmable controller.

Further, the apparatus and the method of the present invention perform high speed scanning by a measuring head without any time constraint, when acquiring position data of the measuring head from the NC device, and measures a two- or three-dimensional shape of the workpiece in a short time, so that it becomes possible to quickly proceed to a machining operation after the measurement.

BRIEF DESCRIPTION OF THE DRAWINGS

FIGS. 1 to 4 illustrate a first embodiment of the present invention, wherein FIG. 1 is a perspective view of a machine tool equipped with a workpiece measuring apparatus having a wired measuring head;

FIG. 2 outlines the configuration of the workpiece measuring apparatus illustrated in FIG. 1;

FIG. 3 is an explanatory view illustrating a situation of measuring the workpiece;

FIG. 4 lists the data input to a control device and results of calculation thereof;

FIG. 7 outlines a configuration of a workpiece measuring apparatus according to an exemplary variation with a prediction system provided therein.

DESCRIPTION OF THE PREFERRED EMBODIMENTS

Figure 1:
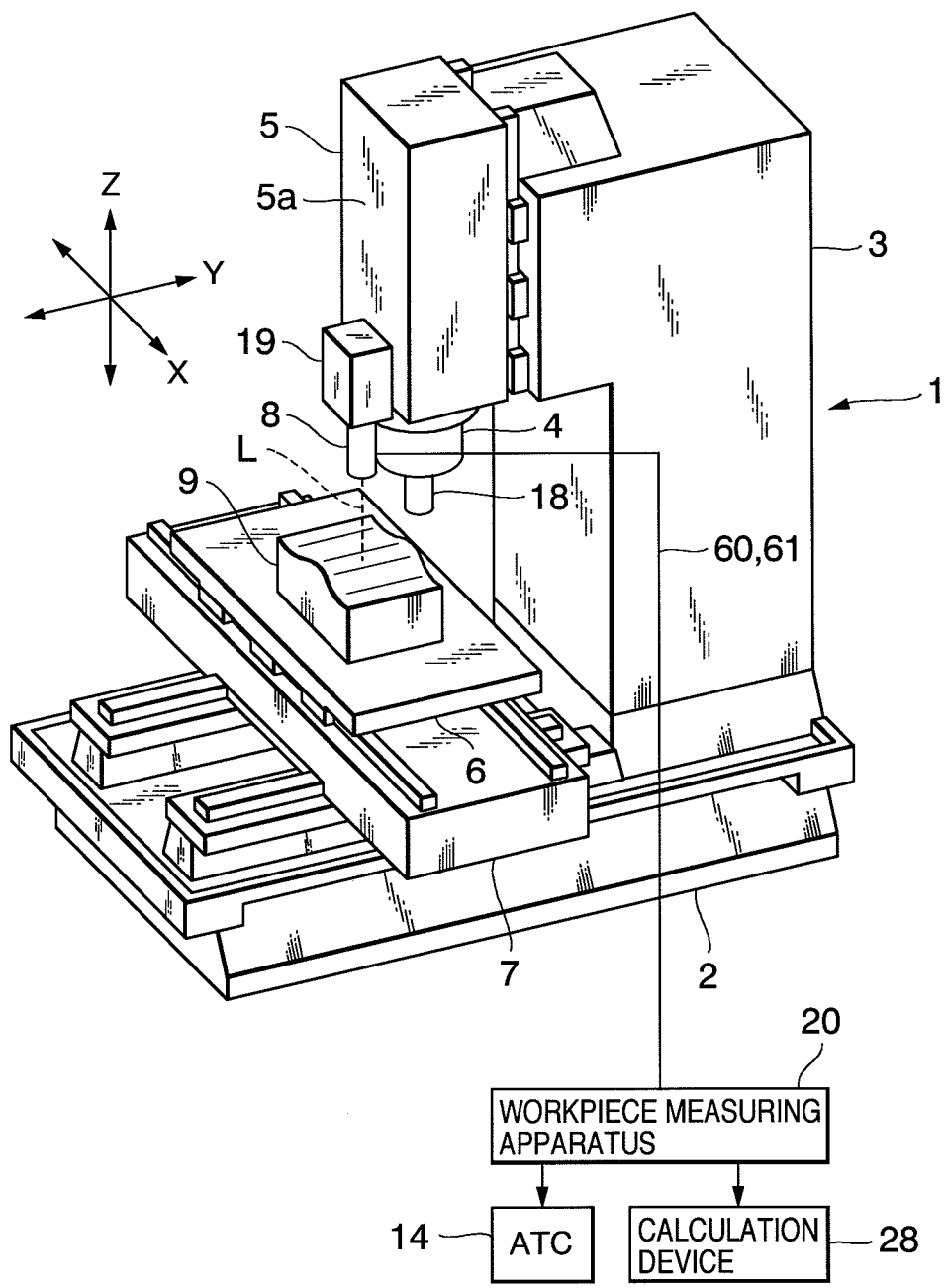

A workpiece measuring apparatus according to the present invention has an external module provided outside an NC (numerical control) device. The external module acquires position data of a measuring head from a position detecting device, and a wired or wireless measuring head simultaneously measures the distance between the workpiece and the measuring head.

The position data of the measuring head acquired by the external module is output to a control device and is stored therein. The distance data to the workpiece measured by the measuring head is also output to the control device and is stored therein. The control device acquires the two- or three-dimensional shape data of the workpiece by performing a calculation on the basis of the position data and the distance data.

As a result, the first to third objects described below is realized according to the present invention. The first object is to eliminate the necessity of modification or change such as adding a new function to the NC device and the programmable controller. The second object is to make the present invention applicable to any machine tool equipped with an NC device and a programmable controller of any configuration by uniquely designing and manufacturing a workpiece measuring apparatus without being restricted by constraints of the NC device and the programmable controller. The third object is to perform high speed scanning by the measuring head without any time constraint, when acquiring the position data of the measuring head from the NC device, and to measure a two- or three-dimensional shape of the workpiece in a short time, so that it becomes possible to quickly proceed to a machining operation after the measurement.

In the following embodiments, a case is shown where the machine tool is a vertical machining center. The machine tool may be a horizontal machining center, a multi-axis turning center, a lathe, a turning machine, a grinder, a laser beam machine, or a multi-axis turning center having a swingable tool spindle.

[Embodiments]
(First Embodiment)

A first embodiment of the present invention will be described below, referring to FIGS. 1 to 4.

Like or corresponding parts are denoted by like or corresponding reference characters throughout views.

Figure 2:
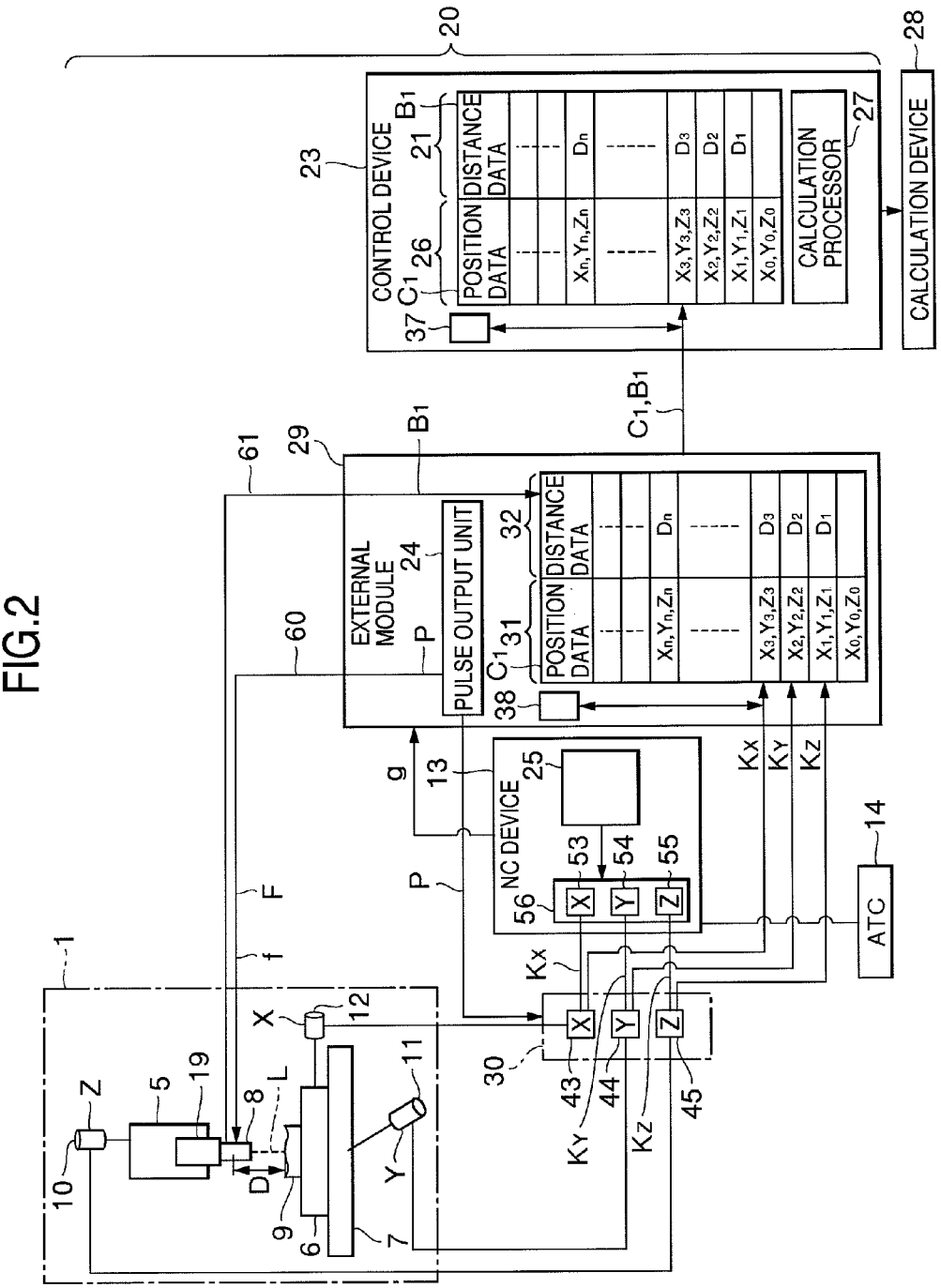
Figure 3:
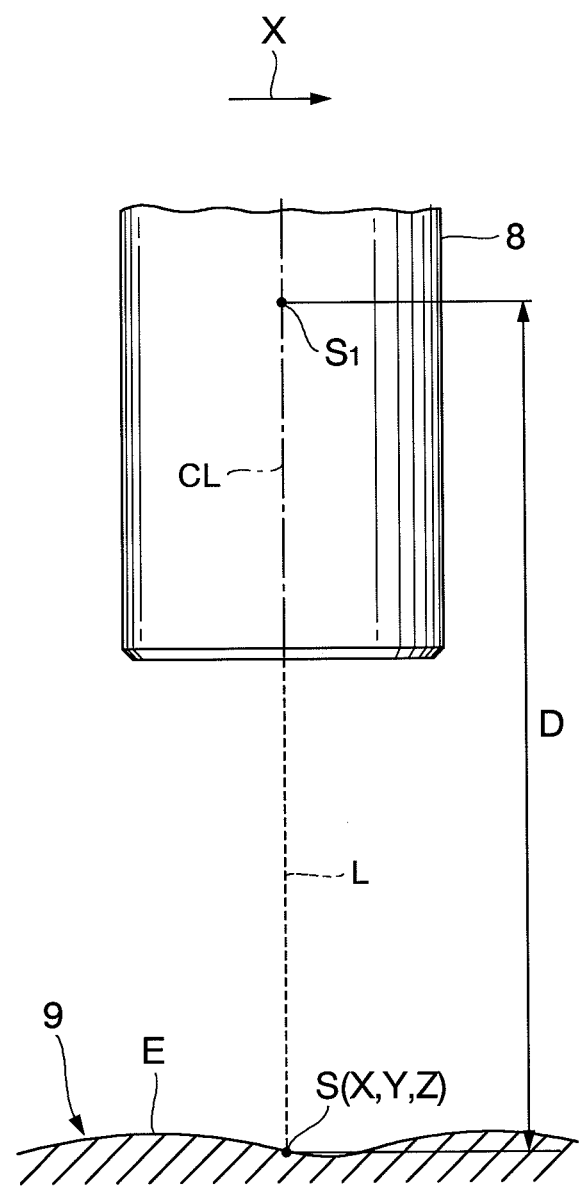

FIG. 1 is a perspective view of a machine tool equipped with a workpiece measuring apparatus having a wired measuring head, FIG. 2 outlines the configuration of the workpiece measuring apparatus illustrated in FIG. 1, FIG. 3 is an explanatory view illustrating a situation of measuring the workpiece and FIG. 4 lists the data input to a control device and results of calculation thereof.

As illustrated in FIGS. 1 and 2, a vertical machining center is illustrated as a machine tool 1 in the present embodiment. The machine tool 1 has a bed 2 installed on the floor surface, a column 3 mounted on the bed 2, a spindle head 5 having a main spindle 4, and a saddle 7 having a table 6. The machine tool 1 is controlled by an NC device (Numerical Control device) 13.

The spindle head 5 is supported by the front face of the column 3 to be movable along the vertical direction (along the Z-axis). A tool 18 is removably attached to a tip of the main spindle 4. The main spindle 4 is supported by the spindle head 5 so that a central axis line of the main spindle 4 is parallel to the Z axis and is rotatable about the central axis line.

The saddle 7 is provided on the bed 2 and is horizontally movable forward and backward (along the Y-axis). The saddle 7 has a table 6 provided thereon. The table 6 is horizontally movable leftward and rightward (along the X-axis). A workpiece 9 is placed on the table 6. The three perpendicular axes comprise movable axes (X-, Y- and Z-axes) which are perpendicular to each other.

The spindle head 5 supported by the column 3 is driven, by a Z-axis feed mechanism 10, to move along the Z-axis. The saddle 7 provided on the bed 2 is driven, by a Y-axis feed mechanism 11, to move along the Y-axis. The table 6 mounted on the saddle 7 to support the workpiece 9 is driven, by an X-axis feed mechanism 12, to move along the X-axis.

As thus described, the spindle head 5, the main spindle 4, the saddle 7 and the table 6 are movable units which can be driven by the feed mechanism 10, 11 and 12 to move along each axis.

The NC device 13 controls the X-axis feed mechanism 12, the Y-axis feed mechanism 11 and the Z-axis feed mechanism 10, respectively. In addition, the NC device 13 controls an ATC (Automatic Tool Changer) 14 which automatically changes the tool 18 on the main spindle 4.

Therefore, the machine tool 1 is a machining center which performs a three-axis control that causes the main spindle 4 and the workpiece 9 to move rectilinearly and relatively along the three perpendicular axes, i.e., the X-, Y- and Z-axes. Note that the spindle head 5 and the workpiece 9 may be relatively moved along the X- and Y-axes, respectively.

The machine tool 1 has a position detecting device 30 including an X-axis scale device 43, a Y-axis scale device 44 and a Z-axis scale device 45.

The X-axis scale device 43 detects the current position of the movable unit along the X-axis and outputs a feedback signal Kx to the NC device 13. The Y-axis scale device 44 detects the current position of the movable unit along the Y-axis and outputs a feedback signal Ky to the NC device 13. The Z-axis scale device 45 detects the current position of the movable unit along the Z-axis and outputs a feedback signal Kz to the NC device 13.

The NC device 13 controls the X-axis feed mechanism 12, the Y-axis feed mechanism 11 and the Z-axis feed mechanism 10, respectively, on the basis of the feedback signals Kx, Ky and Kz which are output from the position detecting device 30. Accordingly, the NC device 13 adjusts the current position of the movable unit along three perpendicular axes to be correct.

As illustrated in FIGS. 1 to 3, a workpiece measuring apparatus 20 has a wired measuring head 8, a control device (for example, a personal computer or a microcomputer) 23 for controlling the measuring apparatus 20, and an external module 29. The module 29 is independently provided outside the NC device 13.

The measuring head 8 is attached to the movable unit (here, the spindle head 5) moving relative to the workpiece 9 within the machining area of the machine tool 1 controlled by the NC device 13. The measuring head 8 detects the position and shape of the workpiece 9. The measuring head 8 is a displacement sensor capable of measuring the distance to the workpiece 9 and outputting the distance data B1.

The measuring apparatus 20 and the workpiece measurement method using the measuring apparatus 20 can measure the workpiece 9 in a non-contact manner (or in a contact manner) by the measuring head 8 attached to the spindle head 5.

An interface (external module 29), which acquires position data C1 of one or more movable axes of the movable unit having the measuring head 8 attached thereto, is provided outside the NC device 13. The external module 29 is configured in such a manner that the position data C1 of the measuring head 8 attached to the movable unit can be acquired at the same time interval $\Delta T$ as that for the distance measurement by the measuring head 8.

The position of the workpiece 9 is calculated from the acquired distance measurement data B1 and the position data C1 of the measuring head 8. The continuous shape of the workpiece 9 can be measured by performing continuous measurement while moving the measuring head 8.

A housing 19 which accommodates the measuring head 8 is attached to a front face 5a of the spindle head 5. The housing 19 supports the measuring head 8 so that the measuring head 8 can enter therein and exit therefrom. The measuring head 8 projects downward from the housing 19 when being used and is accommodated inside the housing 19 when not being used. The measuring head 8 measures the workpiece 9 while the measuring head 8 is exposed downward from the housing 19. The housing 19 supporting the measuring head 8 may be provided on a side face or a bottom face of the spindle head 5.

The module 29 is selected from a group including a digital signal processor, an FPGA (Field Programmable Gate Array), a microcomputer and a personal computer.

When the position data of the measuring head 8 relative to a measurement point (point to be measured) S on the workpiece 9 is fed back from the position detecting device 30 along respective axes (X-, Y- and Z-axes), the module 29 reads and acquires the feedback signals Kx, Ky and Kz regularly at a constant time interval $\Delta T$.

In this exemplary embodiment, the position data C1 of the measuring head 8 is the position data along at least two axes (Z- and X-axes) including a first axis direction (along the Z-axis) and a second axis direction (along the X-axis) in which the measuring head 8 scans. Although the "position along two axes" is usually a position along the Z- and the X-axes which are orthogonal to each other, the two axes may not be orthogonal.

The module 29 reads the feedback signals Kx, Ky and Kz regularly at a constant time interval $\Delta T$ and acquires the position data C1 (X, Y, Z) along three perpendicular axes of the measuring head 8 from the feedback signals Kx, Ky and Kz.

The position data C1 of the measuring head 8 is fed back to the NC device 13 from the position detecting device 30. The module 29 branches and acquires the feedback signals Kx, Ky and Kz which are fed back from the position detecting device 30 to the NC device 13.

The position data C1 of the measuring head 8 may be fed back from the position detecting device 30 to the NC device 13 via the module 29. In this case, the feedback signals Kx, Ky and Kz are sent from the position detecting device 30 to the NC device 13 via the module 29.

The position detecting device 30 may include, instead of the scale devices 43, 44 and 45, an "encoder" which detects the current position of the movable unit on the basis of the angle of rotation of the servomotor and which outputs the feedback signals Kx, Ky and Kz. In this case, the position data C1 of the movable axis having the measuring head 8 attached thereto is the data branched from the motor encoder signal used by the NC device 13.

The measuring apparatus 20 has a pulse output unit 24 provided on the module 29. The pulse output unit 24 outputs a timing pulse P, to be a synchronous signal (trigger), to one or both of the measuring head 8 and the position detecting device 30 (both the measuring head 8 and the position detecting device 30 in this embodiment).

The pulse output unit 24 outputs the timing pulse P having a pulse interval (time interval from one pulse to the next) corresponding to the constant time interval $\Delta T$. The timing pulse P is a "pulse for timing" and is used in the present embodiment to coordinate the timings of the operation of measurement by the measuring head 8 and the operation of search of the current position by the position detecting device 30.

A programmable controller (denoted as controller in the following) 25 for controlling the machine tool 1 is, for example, a PMC (Programmable Machine Controller), a PLC (Programmable Logic Controller) or the like.

The illustrated controller 25 is included in the NC device 13. The configuration of the controller 25 in itself may be separated from the NC device 13.

If a clock and a pulse output are provided in the controller 25, the clock outputs a regular signal at a constant time interval $\Delta T$. According to the signal of the clock, the controller 25 reads and acquires the position data of the measuring head 8 from the NC device 13.

In this case, the minimum constant time interval $\Delta T$ of the signal output from the clock of the controller 25 is 16 [msec (milliseconds)], for example, which is currently difficult to be shortened. As a result, the pulse interval of the timing pulse P is basically 16 [msec], which is identical to the constant time interval $\Delta T$. Therefore, the measuring head 8 can only measure with a time interval of 16 [msec].

In the present embodiment, however, the pulse interval can be arbitrarily set short because the pulse output unit 24 is provided in the module 29. Therefore, the pulse output unit 24 can output the timing pulse P having a pulse interval (e.g., 1 [msec]) corresponding to the constant time interval $\Delta T$.

As a result, the measuring head 8 can measure the workpiece 9 at a very short time interval $\Delta T$ (1 [msec]). Therefore, high speed scanning can be performed by the measuring head 8 without any time constraint, when acquiring the position data C1 of the measuring head 8 from the NC device 13, and the measuring head 8 measures the two- or three-dimensional shape of the workpiece 9 in a short time, so that it becomes possible to quickly proceed to a machining operation after the measurement. In addition, the measuring head 8 can measure a wide range of the workpiece 9 in a short time.

A signal F of a measurement instruction f includes the timing pulse P of the pulse output unit 24 and is output from the module 29. The signal F is sent to the measuring head 8 attached to the spindle head 5 via a wiring 60. The data B1 of the distance to the workpiece 9 measured by the measuring head 8 is sent to the module 29 via a wiring 61.

While the measuring apparatus 20 measures the workpiece 9, the module 29 reads and acquires the position data C1 of the measuring head 8 from the feedback signals Kx, Ky and Kz which are fed back from the position detecting device 30.

The module 29 of the present embodiment acquires the position data C1 along three perpendicular axes (X-, Y- and Z-axes) of the measuring head 8 to the measurement point S on the workpiece 9. The "position of the measuring head 8" is a reference position S1 predetermined in the measuring head 8, which is, for example, the position of an exit of a laser beam L in a laser oscillator.

When the pulse output unit 24 outputs the timing pulse P, the module 29 outputs the signal F, for including the measurement instruction f, to the measuring head 8 via the wiring 60. As a result, the measuring head 8 measures the workpiece 9 according to the measurement instruction f at the same timing as the operation timing that the module 29 acquires the position data C1 of the measuring head 8.

The measuring head 8 thus measures a distance D from the measuring head 8 to the workpiece 9. The measured data B1 is output from the measuring head 8 to the module 29 via the wiring 61.

In this manner, the operation of acquiring the position data C1 of the measuring head 8 by the module 29 and the operation of measuring the workpiece 9 by the measuring head 8 at the time point are always performed repeatedly at the same timing (that is, simultaneously), at a constant time interval $\Delta T$ (1 [msec]).

In other words, the module 29 acquires the position data C1 along at least two axes (Z- and X-axes) of the measuring head 8 to the measurement point S on the workpiece 9 by reading the position data C1 from the feedback signals Kx, Ky and Kz which are fed back from the position detecting device 30.

Simultaneously with this operation of the module 29, and regularly at a constant time interval $\Delta T$ (1 [msec]), the measuring head 8 measures the distance D from the measuring head 8 to the workpiece 9 at the time point.

The position data C1 of the measuring head 8 acquired by the module 29 is output to the control device 23 and is stored therein. The data B1 of the distance to the workpiece 9 measured by the measuring head 8 according to the measurement instruction f is temporarily output to and stored in the module 29, and is subsequently output to the control device 23 and is stored therein. The distance data B1 may be directly output from the measuring head 8 to the control device 23.

By performing calculation on the basis of the position data C1 and the distance data B1, the control unit 23 acquires the two- or three-dimensional shape data of the workpiece 9.

According to the measuring apparatus 20 of the above-mentioned configuration and the workpiece measurement method using the apparatus 20, no modification or change is required such as adding a new function to the NC device 13 and the controller 25. In addition, the measuring apparatus 20 can be uniquely designed and manufactured without being restricted by constraints of the NC device 13 and the controller 25.

As a result, the measuring apparatus 20 can be applied to the machine tool 1 equipped with an NC device and a programmable controller of any configuration.

The operation, of acquiring the position data C1 along at least two axes (Z- and X-axes) of the measuring head 8 for the measurement point S on the workpiece 9, and the operation of measuring the workpiece 9 by the measuring head 8 at the time point are repeatedly performed at a very short constant time interval $\Delta T$ (1 [msec])

As a result, the two- or three-dimensional shape of the workpiece 9 can be measured by processing the position data C1 and the distance data B1. In addition, the measuring head 8 can perform high speed scanning to measure the workpiece 9 precisely in a short time, so that it becomes possible to quickly proceed to a machining operation after the measurement.

In measuring apparatus 20, the module 29 and the control device 23 are separated from the NC device 13 and the controller 25. Therefore, the measuring apparatus 20 can be designed or modified uniquely and freely without being restricted by the design standard or configuration of the NC device 13 and the controller 25.

The operation of acquiring the position data C1 of the measuring head 8 from the NC device 13 is performed intermittently during the operation control on the machine tool 1, which is the primary role of the NC device 13. Since the module 29 is provided in the present invention, the position data C1 of the measuring head 8 can be acquired at a precise timing. In addition, it is also possible to acquire a large amount of the distance data B1 from the measuring head 8 at high speed by shortening the time interval $\Delta T$ for acquiring the position data C1. Therefore, a wide range of the workpiece 9 can be measured in a short time.

The module 29 has a position data temporary memory 31 and a distance data temporary memory 32. The memories 31 and 32 combine and store, at same time points, the position data C1 of the movable axis output from the position detecting device 30 along each axis of the movable unit and the distance data B1 measured by the measuring head 8. Although the memories 31 and 32 are preferred to be ring-shaped buffer memories, other types of memory may be used.

The module 29 acquires the position data C1 of the measuring head 8 from the feedback signals Kx, Ky and Kz, which are fed back from the position detecting device 30, at the timing of the timing pulse P which is output from the pulse output unit 24 regularly at a constant time interval $\Delta T$ (1 [msec]). Subsequently, the position data C1 is sent to the control device 23.

In other words, the module 29 temporarily stores the position data C1 in the position data temporary memory 31. Subsequently, the position data C1 is output to the position data memory 26 of the control device 23 and is stored therein.

The module 29 reads the feedback signals Kx, Ky and Kz regularly at a constant time interval $\Delta T$ (1 [msec]) according to an instruction of a newest address counter 38, and acquires the position data C1 of the measuring head 8 [position data C1 of the three perpendicular axes (X-, Y- and Z-axes)]. The position data temporary memory 31 then temporarily stores the position data C1.

Current position information (coordinate) 53 along the X-axis of the movable unit is included in the feedback signal Kx which is output from the X-axis scale device 43. Current position information (coordinate) 54 along the Y-axis of the movable unit is included in the feedback signal Ky which is output from the Y-axis scale device 44. Current position information (coordinate) 55 along the Z-axis of the movable unit is also included in the feedback signal Kz which is output from the Z-axis scale device 45. The current position information 53 along the X-axis of the movable unit, the current position information 54 along the Y-axis, and the current position information 55 along the Z-axis are respectively input to a driving unit 56 of the NC device 13.

The driving unit 56 drives the X-axis feed mechanism 12, the Y-axis feed mechanism 11 and the Z-axis feed mechanism 10, respectively, on the basis of the current position information 53, 54 and 55 respectively included in the feedback signals Kx, Ky and Kz.

The position detecting device 30 along each axis direction (X-, Y- and Z-axes) feeds back the feedback signals Kx, Ky and Kz including the position data C1 of the measuring head 8, and outputs them to the position data temporary memory 31 of the module 29. The memory 31 temporarily stores the position data C1 included in the feedback signals Kx, Ky and Kz. The position data C1 stored in the position data temporary memory 31 is subsequently output to the control device 23 and is stored therein.

The distance data B1 measured by the measuring head 8 is output to and temporarily stored in the distance data temporary memory 32 of the module 29, and is subsequently output to the control device 23 and is stored therein.

As described above, the module 29 reads the feedback signals Kx, Ky and Kz regularly at a constant time interval ΔT (1 [msec]) and acquires the position data C1 of the measuring head 8. The position data C1 is then temporarily stored in the position data temporary memory 31, and is subsequently output to the control device 23 from the module 29.

Upon measuring the workpiece 9 by the measuring head 8, the distance data B1 is output to the module 29 from the measuring head 8. The distance data B1 is temporarily stored in the distance data temporary memory 32 of the module 29, and is subsequently output to the control device 23 from the module 29.

For example, the module 29 reads, from the feedback signals Kx, Ky and Kz, the current position information along the X-, Y- and Z-axes of the measuring head 8 when the first measurement point S on the workpiece 9 is measured. Accordingly, coordinate values "X1, Y1, Z1" are written in the address "1" of the position data temporary memory 31.

Subsequently, the module 29 reads, from the feedback signals Kx, Ky and Kz, the current position information along the X-, Y- and Z-axes of the measuring head 8 when the second measurement point S on the workpiece 9 is measured. Accordingly, coordinate values "X2, Y2, Z2" are written in the address "2" of the position data temporary memory 31.

Likewise, the module 29 reads, from the feedback signals Kx, Ky and Kz, the current position information along the X-, Y- and Z-axes of the measuring head 8 when the N-th measurement point S on the workpiece 9 is measured. Accordingly, coordinate values "Xn, Yn, Zn" are written in the address "N" of the position data temporary memory 31.

In this manner, the N, i.e., the first to N-th position data C1 of the measuring head 8 are temporarily stored in the position data temporary memory 31 in this order. Subsequently, the N, or a predetermined number of position data C1 are simultaneously stored in the position data memory 26 of the control device 23.

The position data temporary memory 31 may be separately provided outside the module 29. In addition, a memory provided inside the NC device 13 or the controller 25 may be diverted for the position data temporary memory 31.

When, on the other hand, the measuring head 8 has measured the first measurement point S on the workpiece 9, for example, the measuring head 8 measures a distance D1 from the measuring head 8 to the workpiece 9 at the time point. The module 29 then reads the distance data, and the distance "D1" is written in the address "1" of the distance data temporary memory 32.

When, subsequently, the measuring head 8 has measured the second measurement point S on the workpiece 9, the measuring head 8 measures a distance D2 from the measuring head 8 to the workpiece 9 at the time point. The module 29 then reads the distance data, and the distance "D2" is written in the address "2" of the distance data temporary memory 32.

When, likewise, the measuring head 8 has measured the N-th measurement point S on the workpiece 9, the measuring head 8 measures a distance Dn from the measuring head 8 to the workpiece 9 at the time point. The module 29 then reads the distance data, and the distance "Dn" is written in the address "N" of the distance data temporary memory 32.

In this manner, the N, i.e., the first to N-th distance data B1 of the measuring head 8 are temporarily stored in the distance data temporary memory 32 in this order. Subsequently, the N or a predetermined number of the distance data B1 are simultaneously stored in the distance data memory 21 of the control device 23.

The distance data temporary memory 32 may be separately provided outside the module 29. In addition, a memory provided inside the NC device 13 or the controller 25 may be diverted for the distance data temporary memory 32.

The control unit 23 has a calculation processor 27, the position data memory 26 which stores the position data C1, and the distance data memory 21 which stores the distance data B1.

The memories 26 and 21 combine and store, at same time points, the position data C1 of the movable axis which is output from the position detecting device 30 along each axis direction of the movable unit, and the distance data B1 which is measured by the measuring head 8.

The position data C1 along at least two axes on the measuring head 8 is acquired in the module 29 and is temporarily stored in the position data temporary memory 31, and is subsequently stored in the position data memory 26 of the control device 23.

In other words, the position data C1 which has been stored in the position data temporary memory 31 of the module 29 is stored in the position data memory 26. In this occasion, the position data memory 26 sequentially reads the position data C1, according to the instruction output from a starting address memory (counter) 37 provided on the control device 23 and the instruction of the newest address counter 38 provided on the module 29, and stores the position data C1 which has been read in this manner. The two memories 21 and 26 may be provided separately from the control device 23.

The distance data B1 of the workpiece 9 is measured by the measuring head 8 according to the measurement instruction f, and is output to the module 29 via the wiring 61, and is temporarily stored in the distance data temporary memory 32. The distance data B1 is subsequently stored in the distance data memory 21 of the control device 23. In other words, the control device 23 sequentially stores, in the distance data memory 21, the distance data B1 which is sent from the module 29.

The calculation processor 27 performs calculation on the basis of data of the distance D measured by the measuring head 8 (i.e., the distance data B1), and data of the position along the at least two axes (Z- and X-axes) acquired by the module 29 (the data C1 indicating the position of the measuring head 8).

In other words, the calculation processor 27 performs calculation on the basis of the position data C1 stored in the position data memory 26 and the distance data B1 stored in the distance data memory 21. Accordingly, the two- or three-dimensional shape data of the workpiece 9 is acquired.

The tool 18 can be accommodated in a tool magazine. The tool 18 is removable and automatically changed on the main spindle 4 by the ATC 14 controlled by the NC device 13. Therefore, performing a process of measuring the workpiece 9 by the measuring head 8 before (or in the middle of, or after) a process of machining the workpiece 9 by the tool 18 attached to the main spindle 4 causes machining and measurement to take place in this order or in the reverse order. In other words, machining and measurement can be performed in an arbitrary combination.

As thus described, the two- or three-dimensional shape of the workpiece 9 attached to the table 6 can be measured immediately after machining the workpiece 9, without removing the workpiece 9 from the table 6 for measurement. In addition, it is also possible to proceed to the operation of machining the workpiece 9 again after measuring the workpiece 9.

As a related art of the present invention, there may be a case in which the measuring head 8 is removably attached to the main spindle 4. However, attaching and detaching the measuring head 8 to and from the main spindle 4 may cause a measurement error of the measuring head 8 before and after attaching and detaching. In addition, attaching and detaching the tool 18 to and from the main spindle 4 may cause a machining error of the tool 18 before and after attaching and detaching.

In contrast, with the present embodiment, the measuring head 8 is attached to the spindle head 5 but not to the main spindle 4. Therefore, the workpiece 9 can be measured with a high precision by the measuring head 8, without removing the tool 18 from the main spindle 4. In addition, the workpiece 9 can be machined with a high precision by the tool 18.

The measuring head 8 is provided near the tool 18 attached the main spindle 4 of a movable unit (here, the spindle head 5). Accordingly, the measuring head 8 can measure the workpiece 9 at a near position to the tool 18 with a high precision.

The movable unit having the measuring head 8 attached thereto may be, other than the spindle head 5 of the machining center, the table 6 or the saddle 7 of the machining center, a tool rest or turret of a lathe, or a swingable tool spindle of a multi-axis turning center.

The measuring head 8 has built therein a laser oscillator which generates a laser beam L for irradiating the surface of the workpiece 9. The laser beam L generated by the laser oscillator is irradiated at the measurement point S on the surface of the workpiece 9. The measuring head 8 calculates the distance D from the measuring head 8 to the workpiece 9 by receiving the laser beam L reflected from the surface of the workpiece 9.

The distance D is the distance between the reference position S1 of the measuring head 8 and the measurement point S on the workpiece 9 along the direction (i.e., along the Z-axis) of a reference axis CL (e.g., the central axis line CL of the laser beam L emitted from the measuring head 8).

The signal F of the measurement instruction f is sent from the pulse output unit 24 to the measuring head 8 via a wiring (wiring 60). Upon receiving the measurement instruction f, the measuring head 8 generates the laser beam L by the laser oscillator, and irradiates the laser beam L on the workpiece 9.

The laser beam L is reflected at the measurement point S on the workpiece 9. Therefore, the distance D from the measuring head 8 to the workpiece 9 is calculated on the basis of the reflected laser beam L. The distance data B1 including the calculated distance D is output to the module 29 via the wiring 61.

As thus described, upon receiving the measurement instruction f, the measuring head 8 measures the workpiece 9 in a non-contact manner by measuring the distance D from the measuring head 8 to the workpiece 9.

During the measurement operation, the measuring head 8 does not contact the workpiece 9. Therefore, the measuring head 8 can scan safely at high speed and without vibration (or with low vibration) so that a wide range of the workpiece 9 can be measured in a short time.

Next, a procedure of measuring the workpiece 9 with the measuring apparatus 20 will be described.

First, the measuring head 8 is invoked by a measuring program. The spindle head 5 is then moved so that the measuring head 8 attached to the spindle head 5 is positioned at a start point of the measurement (scanning).

Subsequently, the NC device 13, the module 29 and the control device 23 are made ready for measurement by an M-code instruction in the measuring program. The measuring head 8 starts moving over the workpiece 9 according to the movement instruction of the measuring program.

The NC device 13 outputs an instruction g of starting a measurement to the module 29. The module 29 then reads and acquires the position data C1 of the measuring head 8 from the feedback signals Kx, Ky and Kz which are output from the position detecting device 30, according to the timing pulse P which is output from the pulse output unit 24 regularly at a constant time interval $\Delta T$ (1 [msec]).

The position data C1 is the current position information (coordinates) along three perpendicular axes (X-, Y- and Z-axes) of the measuring head 8 relative to the measurement point S on the workpiece 9. The position data C1 is sequentially and temporarily stored in the position data temporary memory 31 of the module 29.

When the module 29 performs the read operation (acquisition operation), the signal F of the measurement instruction f is transmitted from the module 29 to the measuring head 8, on the basis of the timing pulse P of the pulse output unit 24.

Upon receiving the measurement instruction f, the measuring head 8 measures the distance D from the measuring head 8 to the workpiece 9. The distance data B1 which is output from the measuring head 8 is output to the module 29 via the wiring 61, and is temporarily stored in the distance data temporary memory 32. Subsequently, the distance data B1 is output to the distance data memory 21 of the control device 23.

Whenever the module 29 reads the position data C1 of the measuring head 8 from the feedback signals Kx, Ky and Kz and stores them in the position data temporary memory 31 one by one, the value of the newest address counter 38 of the module 29 is incremented by one.

The address written last is kept in the position data temporary memory 31. Subsequently, the module 29 outputs the position data C1 to the position data memory 26 of the control device 23.

The control unit 23 sequentially reads a series of the position data C1 stored in the position data temporary memory 31 and sequentially stores them in the position data memory 26. In this occasion the top address of the series of the position data to be read in the position data temporary memory 31 is kept in the starting address memory 37 of the control device 23, and the value of the starting address memory 37 is updated every time the position data is read.

The last address of the series of the position data to be read is indicated by the newest address counter 38 of the module 29.

When an M-code instruction in the program is output, the control device 23 outputs a measurement termination instruction to the module 29. The measurement by the measuring apparatus 20 is then terminated and the pulse output unit 24 terminates outputting the pulse signal of the timing pulse P. It is determined that the measurement has been terminated if the position detecting device 30 or the measuring head 8 does not receive a pulse signal after a constant time ΔT (1 [msec]) when terminating the output.

The first position data (X0, Y0, Z0) of the series of the position data C1 stored in the position data memory 26 in the control device 23 is deleted. This is because there is no distance data corresponding to the first position data when starting the measurement.

In addition, the last of the distance data B1 is deleted. This is because there is no position data corresponding to the last the distance data.

Subsequently, the calculation processor 27 combines the position data [(X1, Y1, Z1), (X2, Y2, Z2), (X3, Y3, Z3), . . . , (Xn, Yn, Zn), . . . ] with the distance data (D1, D2, D3, . . . , Dn, . . . ) at each time point and calculates the two- or three-dimensional shape data of the workpiece 9.

According to the present invention, the control device 23 has only to process the minimum necessary distance data B1. Therefore, data processing workload is reduced. Accordingly, a small memory capacity suffices for each of the position data temporary memory 31, the distance data temporary memory 32, the position data memory 26 and the distance data memory 21.

The position data temporary memory 31 is provided in the module 29. Therefore, the position data C1 of the three perpendicular axes (X-, Y- and Z-axes) of the measuring head 8 can be temporarily stored in the position data temporary memory 31.

Subsequently, a collection of the plurality of position data C1 can be sequentially stored in the position data memory 26, according to the instruction, which is output from the starting address memory 37 of the control device 23, and the instruction of the newest address counter 38 of the module 29. Therefore, only a small workload of the module 29, the position data temporary memory 31 and the control device 23 is required for processing the position data C1.

The calculation processor 27 performs calculation on the basis of the distance data B1, which is stored in the distance data memory 21, and the position data C1 along three perpendicular axes of the measuring head 8 stored in the position data memory 26. Accordingly, the two- or three-dimensional shape data of the workpiece 9 is acquired.

Respective coordinate data (two- or three-dimensional shape data) of numerous measurement points S on the workpiece 9 are calculated in this manner. Respective coordinate data of the numerous measurement points S are output to a calculation device (e.g., personal computer) 28 provided separately from the control device 23.

The calculation device 28 collects the coordinates of the numerous measurement points S, whereby a solid, i.e., three-dimensional shape E of the workpiece 9 (FIG. 3) is acquired.

FIG. 4 illustrates the data B1 of the measured distance D which is input to the control device 23, the position data C1 along three perpendicular axes, and the result of calculation on the basis of the data B1 of the measured distance D and the position data C1. The calculation result is the three-dimensional shape data (i.e., coordinates of the measurement points S on the workpiece 9).

The above description shows a case in which the pulse output unit 24 outputs the timing pulse P at a pulse interval of 1 [msec]. Since the timing pulse P is used to check the timing of data acquisition, any value suffices as the pulse interval and measurement interval without any constraint.

With regard to termination of the measurement by the measuring apparatus 20, it is determined that the measurement has terminated if no pulse signal of the timing pulse P is input to the measuring head 8 and the position detecting device 30 at a predetermined pulse interval (1 [msec]).

With this determination method, the pulse interval is assumed to be long (e.g., 160 [msec]). In this case, the measuring head 8 keeps measuring the workpiece 9 and outputting the distance data B1 until the measuring head 8 recognizes that no timing pulse P has arrived for a long time such as 160 [msec], even if the module 29 receives the measurement termination instruction from the control device 23. As a result, the distance data B1 acquired by the module 29 immediately before the measurement terminates becomes meaningless.

Therefore, the NC device 13 is configured in such a manner that it transmits the measurement termination instruction g to the module 29, and the measuring head 8 terminates the measurement when the module 29 receives the instruction g. In this manner, the disadvantage that the module 29 acquires unnecessary data immediately before the measurement termination in vain is eliminated.

As an exemplary variation of the first embodiment, there may be a case in which the wired measuring head 8 is removably attached to the main spindle 4 of the machine tool 1. In this case, the operator is supposed to manually attach or remove the measuring head 8 to and from the main spindle 4 after having removed the tool 18 from the main spindle 4 at the ATC 14, when measuring the workpiece 9.

In this manner, the measuring apparatus 20 of the present invention can also be applied to an already attached machine tool.

(Second Embodiment)

Figure 5:
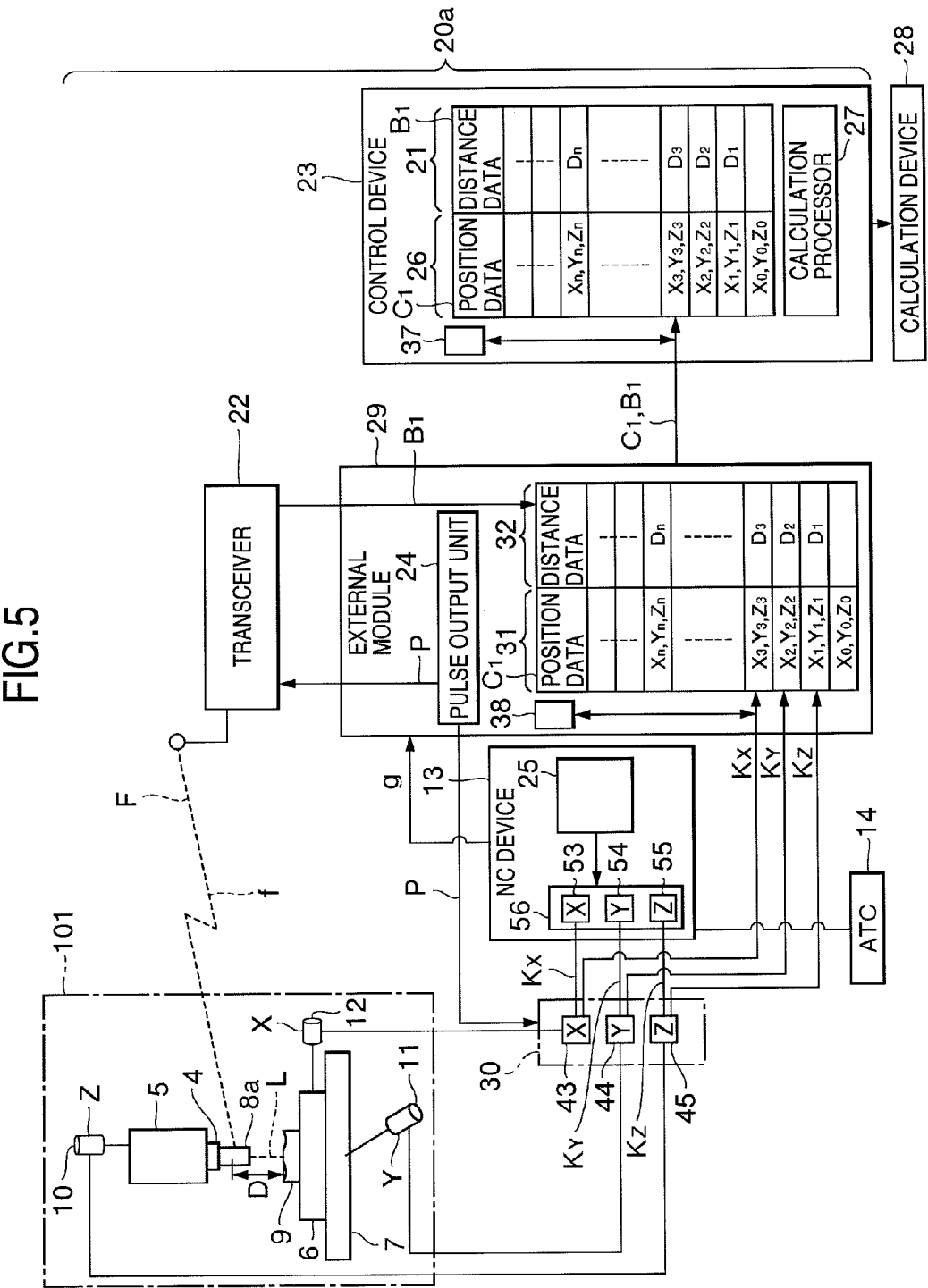
FIG. 5 outlines a configuration of a workpiece measuring apparatus having a wireless measuring head according to a second embodiment.

FIG. 5 outlines a configuration of a workpiece measuring apparatus 20a on a machine tool 101 having a wireless measuring head 8a according in a second embodiment of the present invention. Here, components identical or equivalent to those of the first embodiment are provided with identical reference numerals and description thereof is omitted.

As illustrated in FIG. 5, the measuring apparatus 20a has the wireless measuring head 8a which measures the workpiece 9. The measuring head 8a is attached to the spindle head 5, which is a movable unit moving relative to the workpiece 9, in a machining area of the machine tool 101 controlled by the NC device 13, and detects the position and shape of the workpiece 9. The measuring head 8a is a displacement sensor capable of measuring the distance D to the workpiece 9 and of outputting the distance data B1.

The measuring apparatus 20a has the control device 23, which controls the apparatus 20a, and the module 29.

The module 29, which acquires the position data C1 of one or more movable axes of the spindle head 5 having the measuring head 8a attached thereto, is provided outside the NC device 13. The external module 29 is configured in such a manner that the position data C1 of the measuring head 8a attached to the spindle head 5 can be acquired at the same time interval ΔT as with the distance measurement by the measuring head 8a. From the acquired distance measurement data B1 and the position data C1 of the measuring head 8a, the position of the workpiece 9 is calculated. Thus the continuous shape of the workpiece 9 can be measured by performing continuous measurement while moving the measuring head 8a.

The module 29 is provided separately from the NC device 13. The module 29 acquires the feedback signals Kx, Ky and Kz regularly at a constant time interval ΔT (1 [msec]), when the position data C1 along at least two axes including a first axis direction (along the Z-axis) of the measuring head 8a to the measurement point on the workpiece 9 and a second axis direction (along the X-axis) in which the measuring head 8a scans is fed back from the position detecting device 30 along each axis direction.

The pulse output unit 24 of the measuring apparatus 20a is provided on the module 29. The pulse output unit 24 outputs the timing pulse P to one or both (both in this embodiment) of the measuring head 8a and the position detecting device 30 along each axis direction.

The position data C1 of the measuring head 8a is fed back from the position detecting device 30 to the NC device 13. The module 29 branches and acquires the feedback signals Kx, Ky and Kz which are fed back from the position detecting device 30 to the NC device 13.

When measuring by the measuring apparatus 20a, the measuring head 8a measures the workpiece 9. The module 29 then acquires the position data C1 of the measuring head 8a from the feedback signals Kx, Ky and Kz which are fed back from the position detecting device 30. The position data C1 of the measuring head 8a acquired by the module 29 is output to the control device 23 and is stored therein.

On the other hand, the distance data B1 of the workpiece 9 measured by the measuring head 8a is output to the control device 23 and is stored therein. The control device 23 then acquires the two- or three-dimensional shape data of the workpiece 9 by a calculation on the basis of the position data C1 and the distance data B1.

The measuring apparatus 20a of the above-mentioned configuration and the workpiece measurement method according to the device 20a brings about a similar effect to that of the first embodiment.

The position detecting device 30 along each axis direction outputs the feedback signals Kx, Ky and Kz of the position data C1 to the position data temporary memory 31 of the module 29. The position data C1 temporarily stored in the position data temporary memory 31 is output to the control device 23 and is stored therein.

The distance data B1 measured by the measuring head 8a is output to the distance data temporary memory 32 of the module 29 and is temporarily stored therein, and subsequently is output to the control device 23 and is stored therein.

On the machine tool 101, a tool (not shown) or the measuring head 8a is removably attached to the tip of the main spindle 4. The NC device 13 controls the ATC 14 which automatically changes the tool and the measuring head 8a, respectively, on the main spindle 4. The measuring head 8a is automatically changed by the ATC 14 to be attached to or removed from the main spindle 4 of the machine tool 101.

Therefore, the machine tool 101 is a machining center which performs a three-axis control which causes the tool or the measuring head 8a and the workpiece 9 to relatively move straight along three perpendicular axes of the X-, Y- and Z-axes. The configuration of the machine tool 101 is identical to the machine tool 1 of the first embodiment except that the measuring head 8a is a wireless type.

The measuring apparatus 20a and the workpiece measurement method using the measuring apparatus 20a can measure the workpiece 9 in a non-contact (or contact) manner by the measuring head 8a which is attached to the main spindle 4 of the machine tool 101.

Since the measuring head 8a is a wireless type, the measuring apparatus 20a has a transceiver 22 for performing wireless transmission and reception with the measuring head 8a which is attached to the main spindle 4. The pulse output unit 24 provided to the module 29 outputs the timing pulse P to the transceiver 22. The timing pulse P is used at the transceiver 22 to coordinate the timings.

A signal F including the measurement instruction f and the distance data is transmitted and received between the transceiver 22 and the measuring head 8a in a wireless manner. Upon receiving the timing pulse P from the pulse output unit 24, the transceiver 22 transmits, to the measuring head 8a, the signal F of the measurement instruction f which has been coordinated to the timing of the timing pulse P.

When the measurement instruction f is input to the measuring head 8a, the measuring head 8a measures the distance D from the measuring head 8a to the workpiece 9. The signal F including the measured data is transmitted from the measuring head 8a to the transceiver 22 in a wireless manner. The transceiver 22 transmits the distance data B1 received from the measuring head 8a to the module 29. Subsequently, the distance data B1 is sent to the control device 23.

As thus described, in the present embodiment, the signal F of the measurement instruction f is transmitted from the transceiver 22 to the measuring head 8a in a wireless manner. Upon receiving the measurement instruction f, the measuring head 8a measures the distance D from the measuring head 8a to the workpiece 9.

When performing a measurement, the measuring head 8a does not come in contact with the workpiece 9. Therefore, the measuring head 8a can scan safely at high speed and without vibration (or with low vibration) so that a wide range of the workpiece 9 can be measured in a short time.

Next, another exemplary variation of the present invention in the first and second embodiments will be described.

Although a configuration is shown in each of the above-mentioned embodiments in which the control device 23 and the external module 29 are separated each other, they may not be separated. For example, there are cases in which both the control device 23 and the external module 29 are put together, or a case in which either one of the control device 23 and external module 29 is built inside the other.

The external module 29 of each of the above-mentioned embodiments branches and acquires the feedback signals Kx, Ky and Kz which are fed back from the position detecting device 30 to the NC device 13. In other words, although the position detecting device 30 for feedback purpose is also used for measuring the workpiece 9, the position detecting device 30 of the present invention may be a device separately added only for dedicated use for measuring the workpiece 9. In this case, the position data C1 of the movable axis having the measuring heads 8 and 8a attached thereto is data output from the dedicated position detecting device 30.

The workpiece measuring apparatus having the position detecting device 30 dedicated for measuring the workpiece and the method will be described.

When the position data of the measuring heads 8 and 8a relative to the measurement point S on the workpiece 9 is output from the position detecting device 30 along each axis direction (X-, Y- and Z-axes), the external module 29 reads and acquires the output signals Kx, Ky and Kz regularly at a constant time interval ΔT.

The position data C1 of the measuring heads 8 and 8a is the position data of at least two axes (Z- and X-axes) including a first axis direction (along the Z-axis) and a second axis direction (along the X-axis) in which the measuring heads 8 and 8a scan.

The module 29 reads, regularly at a constant time interval ΔT, the output signal Kx, Ky and Kz, which are output from the position detecting device 30, and acquires the position data C1 (X, Y, Z) along three perpendicular axes of the measuring heads 8 and 8a from the output signals Kx, Ky and Kz.

The position detecting device 30 is only for measuring the workpiece 9. Therefore, the measuring apparatuses 20 and 20a and the position detecting device 30 can be designed or modified uniquely and freely without being restricted by the design standard or configuration of the position detecting device for the NC device 13.

The machine tools 1 and 101 of each of the above-mentioned embodiments are machining centers which performs a three-axis control which causes the main spindle 4 and the workpiece 9 to relatively move straight along three perpendicular axes of the X-, Y- and Z-axes.

As yet another exemplary variation, the machine tool may be a four- or five-axis controlled machine tool. This machine tool performs a three-axis control, which cause the main spindle 4 and the workpiece 9 to relatively move straight along three perpendicular axes of the X-, Y- and Z-axes, and a control capable of relative swivel movement with one or more pivot axes (B- and C-axes)

With this exemplary variation, the measuring heads 8 and 8a attached to the movable unit (e.g., the spindle head 5 or a tool rest) can move relatively to the workpiece 9 along the three perpendicular axes, and swivel around the pivot axis.

When the position data along at least two axes including a first axis direction (along the Z-axis) of the measuring heads 8 and 8a relative to the measurement point on the workpiece 9 and a second axis direction (along the X-axis) in which the measuring heads 8 and 8a scan (in this case, position data along three perpendicular axes and around the pivot axis) is fed back or is output from the position detecting device, the module 29 acquires the feedback signal (or output signal) regularly at a constant time interval ΔT.

The module 29 then acquires the position data of the measuring heads 8 and 8a from the feedback signal (or output signal), which is fed back (or is output) from the position detecting device.

Figure 6:
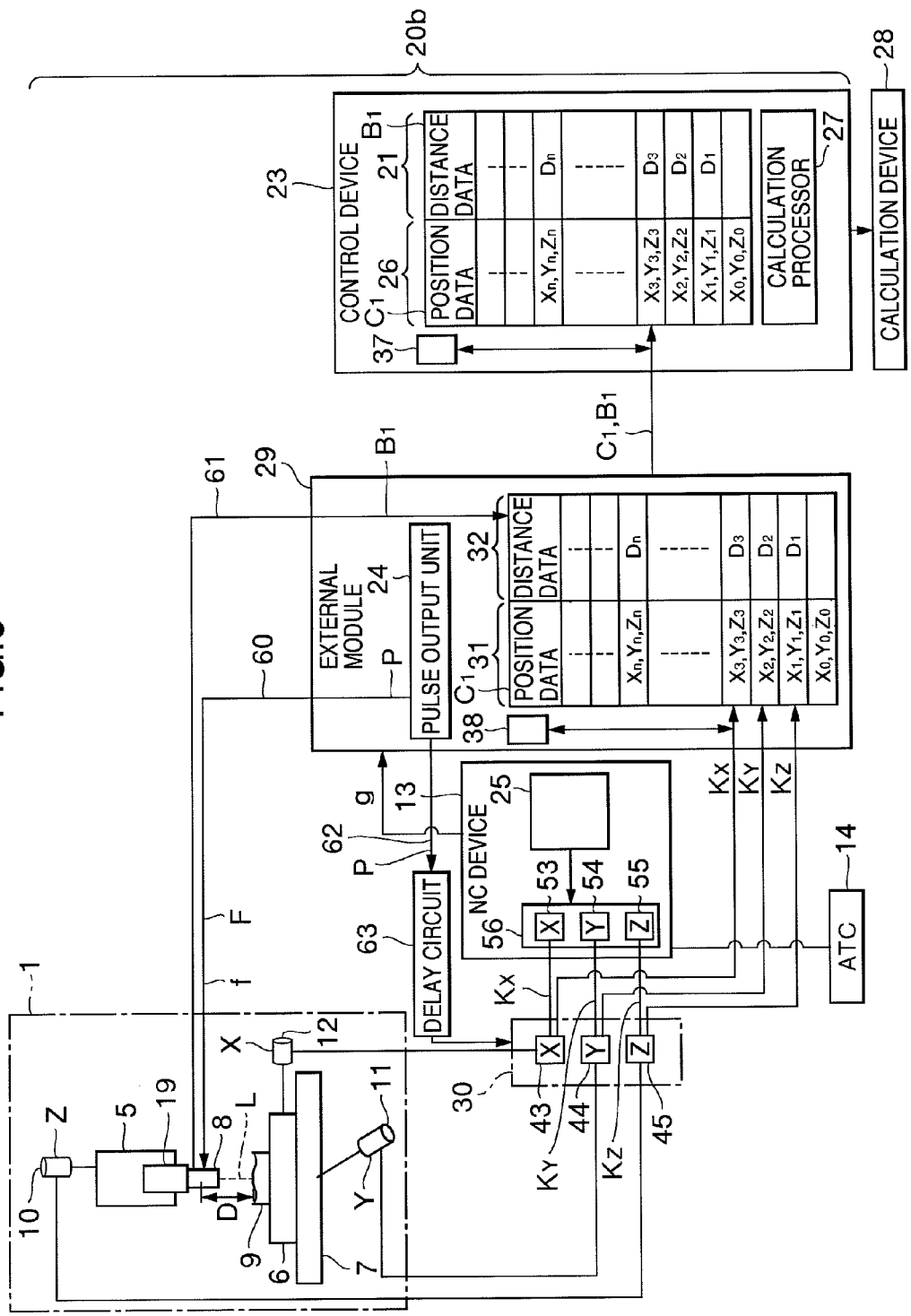
FIG. 6 outlines a configuration of a workpiece measuring apparatus according to an exemplary variation with a delay circuit provided therein.

FIG. 6 outlines a configuration of a workpiece measuring apparatus 20b according to an exemplary variation with a delay circuit 63 provided therein. FIG. 7 outlines a configuration of a workpiece measuring apparatus 20c according to an exemplary variation with a prediction system 65 provided therein. Here, components identical or equivalent to those of the above embodiments are provided with identical reference numerals and description thereof is omitted.

With the measuring apparatus 20b illustrated in FIG. 6, the delay circuit 63 is provided to the circuit 62 in which the timing pulse P is output from the pulse output unit 24 of the external module 29 to the position detecting device 30. The timing pulse P which is supposed to be input to the position detecting device 30 is thus input to the position detecting device 30 intentionally delayed by the delay circuit 63 for a preset time difference.

In contrast, with the measuring apparatus 20c illustrated in FIG. 7, the prediction system 65 is provided to the circuit 64 in which the timing pulse P is output from the pulse output unit 24 of the external module 29 to the measuring heads 8 and 8a. The signal F including the timing pulse P which is supposed to be input to the measuring heads 8 and 8a is thus input to the measuring head 8, 8a intentionally accelerated by the prediction system 65 for a preset time difference.

Providing the delay circuit 63 or the prediction systems 65 as described above allows a first time to easily coincide with a second time. The first time is a time that the measuring heads 8 and 8a take to measure the distance D to the workpiece 9 according to the instruction of the timing pulse P for the measuring head 8, 8a. The second time is a time that the module 29 takes to acquire the position relative to the measurement point along at least two axes of the measuring heads 8 and 8a according to the instruction of the timing pulse P for the position data.

In other words, the position data C1 of the measuring heads 8 and 8a can be acquired at the same time interval ΔT as that for the distance measurement by the measuring heads 8 and 8a because the above-mentioned first and second times coincide. As a result, the position of the workpiece 9 is acquired by calculation from the acquired distance measurement data B1 and the position data C1 of the measuring heads 8 and 8a. Accordingly, the continuous shape of the workpiece 9 can be measured by performing continuous measurement while moving the measuring heads 8 and 8a brings about a similar effect to that of the above-mentioned embodiments.

The apparatus for and a method of measuring a workpiece on a machine tool according to the present invention is applicable to, other than a machining center, a machine tool such as a multi-axis turning center, a lathe, a turning machine, a grinder, a laser beam machine, or the like, and to capable of measuring the workpiece in a non-contact (or contact) manner.

Although embodiments (including various exemplary variations) of the present invention have been described, the present invention is not limited to the foregoing embodiments, and a variety of modification, addition or the like are possible within the scope of the present invention.

What is claimed is:

1. A workpiece measuring apparatus to detect a position and a shape of a workpiece, said workpiece measuring apparatus comprising:
    a measuring head attached to a movable unit of a machine tool moving relative to said workpiece, within a machining area of said machine tool controlled by an NC device,
    wherein said measuring head is a displacement sensor capable of measuring a distance to the workpiece and outputting distance data;
    an external module provided outside said NC device to acquire position data of one or more movable axes of said movable unit having said measuring head attached thereto,
    wherein said external module includes a pulse output unit outputting a timing pulse to said measuring head so that said measuring head measures a distance to the workpiece in accordance with said timing pulse, and
    wherein said external module is configured to acquire the position data of said measuring head attached to said movable unit in accordance with said timing pulse at the same timing as that of a distance measurement by said measuring head; and
    a calculator, wherein a position of said workpiece is acquired by calculation thereof from said acquired distance measurement data and said position data of said measuring head;
    wherein a continuous shape of said workpiece is measured by performing continuous measurement while moving said measuring head.

2. The workpiece measuring apparatus on the machine tool according to claim 1, comprising a memory which combines and stores, at same time points, said position data of each said movable axis which is output from a position detecting device along said each axis direction of the movable unit and said distance data which is measured by said measuring head.

3. The workpiece measuring apparatus on the machine tool according to claim 1, wherein said position data of each said movable axis having said measuring head attached thereto is data branched from a motor encoder signal used by said NC device, or data which is output from a separately added dedicated position detecting device.

4. A method of measuring a workpiece on a machine tool, said method comprising:

detecting a position and a shape of said workpiece by a measuring head attached to a movable unit of said machine tool moving relative to said workpiece, within a machining area of said machine tool controlled by an NC device, wherein, with a workpiece measuring apparatus used in said method, said measuring head is a displacement sensor capable of measuring a distance to the workpiece and outputting distance data, an external module is provided outside said NC device to acquire position data of one or more movable axes of said movable unit having said measuring head attached thereto, said external module includes a pulse output unit outputting a timing pulse to said measuring head so that said measuring head measures a distance to the workpiece in accordance with said timing pulse, said external module is configured to acquire the position data of said measuring head attached to said movable unit in accordance with said timing pulse at the same timing as that of a distance measurement by said measuring head, a position of said workpiece is acquired by calculation from said acquired distance measurement data and said position data of said measuring head, and a continuous shape of said workpiece is measured by performing continuous measurement while moving said measuring head.

* * * * *